US012760772B2

(12) United States Patent
Curatoli et al.

(10) Patent No.: US 12,760,772 B2
(45) Date of Patent: Oct. 13, 2026

(54) BRAKE DEVICE FOR THE REALIZATION OF LAMINAR PACKAGES FOR ELECTRICAL USE

(71) Applicant: CORRADA S.P.A., Milan (IT)

(72) Inventors: Alberto Curatoli, Rho (IT); Davide Verri, Inveruno (IT)

(73) Assignee: CORRADA S.P.A., Milan (IT)

( * ) Notice: Subject to any disclaimer, the term of this patent is extended or adjusted under 35 U.S.C. 154(b) by 829 days.

(21) Appl. No.: 18/007,828

(22) PCT Filed: May 31, 2021

(86) PCT No.: PCT/IB2021/054760
§ 371 (c)(1),
(2) Date: Dec. 2, 2022

(87) PCT Pub. No.: WO2021/245535
PCT Pub. Date: Dec. 9, 2021

(65) Prior Publication Data

US 2023/0235799 A1 Jul. 27, 2023

(30) Foreign Application Priority Data

Jun. 3, 2020 (IT) ........................ 102020000013117

(51) Int. Cl.
*B23Q 11/00* (2006.01)
*F16D 63/00* (2006.01)

(52) U.S. Cl.
CPC ........ *F16D 63/008* (2013.01); *B23Q 11/0092* (2013.01)

(58) Field of Classification Search
CPC ...... B21D 28/14; B21D 28/145; B21D 28/18; B21D 28/20; B21D 28/22; B21D 43/22; H02K 1/148
See application file for complete search history.

(56) References Cited

U.S. PATENT DOCUMENTS 4,403,489 A * 9/1983 Munsterman .......... B21D 28/22 72/131
5,797,306 A * 8/1998 Kufahl .................. B21D 28/22 474/84
2012/0241095 A1 9/2012 Hirata
2017/0106427 A1 4/2017 Vahle

FOREIGN PATENT DOCUMENTS

EP 2902129 A1 8/2015
EP 3235577 A1 10/2017
JP 2008078345 A 4/2008
JP 6676815 B1 4/2020

* cited by examiner

*Primary Examiner* — Teresa M Ekiert
(74) *Attorney, Agent, or Firm* — Dickinson Wright PLLC; Andrew D. Dorisio

(57) ABSTRACT

A brake device (10, 10') for the realization of laminar packages for electrical use defined by the overlapping of magnetic laminations formed by shearing, coupled to a shearing apparatus (13) below a shearing mould (14), with said brake device comprising a brake block (15, 15'), provided with an opening (16, 16') with a shape corresponding to that of a lamination (12') and with a size smaller than that of the lamination to define with said lamination an interference (Δ) functional to the packing of the laminations (12') and comprising mechanical stress compensation means adapted to keep said interference (Δ) constant.

9 Claims, 4 Drawing Sheets

BRAKE DEVICE FOR THE REALIZATION OF LAMINAR PACKAGES FOR ELECTRICAL USE

TECHNICAL FIELD

The present invention relates to a brake device for the realization of laminar packages for electrical use.

BACKGROUND

More specifically, the present invention refers to a brake device used in the shearing moulds adapted to obtain, starting from a metal sheet, magnetic laminations packed or overlapping one another to define laminar packages for use such as in electric machines motors, generators, transformers, meters, ignition coils and similar electrical equipment.

As is known, the aforementioned laminar packages are made by overlapping individual laminations (defined in a single body or r consisting of lamination portions assembled together to define the lamination) by placing them in direct contact with each other.

The realization of laminar packages traditionally occurs by overlapping and connecting the individual laminations which are obtained, for example, from shearing moulds which form the laminations by means of a punch and, for example, from a strip lamination such as, for example, in the case of the traditional shearing methods referred to in US2017/0106427 and JP6676815 and with said laminations which, after forming, can be overlapped and connected to each other on the same machine which forms the single lamination such as, for example, described in JP2008078345.

The laminations can be connected to each other by means of coupling or hooking parts called "staples" or "embossments" which are obtained by deformation of the laminations themselves in specifically selected positions and with said lamination parts which, during the coupling step, are introduced or forced into corresponding recessed portions of an underlying lamination to form, by successive overlapping, the package of laminations.

For this purpose, inside the lamination shearing mould and below the shearing element, a rigid element is typically arranged, called brake and characterized by a reduced size with respect to the size of the shearing element and, by interference (linked to the aforementioned size difference with respect to the shearing element), it is capable of breaking the shearing element. By way of example, in the case of shearing a round-shaped lamination and considering a shearing element with a diameter of 10 mm, the brake element must have a diameter approximately equal to, for example, 9.99 mm so as to define an interference A of 0.01 mm between the diameter of the lamination (which will have a diameter equal to that of the shearing element) and the diameter of the brake element; such an interference of 0.01 mm along the entire perimeter of the round shape (considering the example of the round lamination) generates a force with direction opposite the shearing load and this allows the lamination to remain "clinging" inside the brake for forming the laminar package (traditional brake devices (or counter-punches) with the aforementioned features are described, for example, in EP3235577 or EP2902129 or, again, in US2012/0241095).

For the above reasons, it is clear that the brake element defines a fundamental apparatus in the realization and packing processes of the individual laminations to define a laminar package and this because, only by virtue of the presence of the brake element is it possible to generate a necessary counterforce to allow the interference of the packing embossments in the lamination during the shearing process.

Therefore, such a brake element, which is a rigid element, is subjected to mechanical stresses which are generated due to the interference between said brake element and the sheared lamination, with said stresses which, if too high, can cause the formation of pickups on the shearing profile (and therefore on the laminar package) and also the breakage of the shearing element itself.

Furthermore, it is known that the stresses inside the brake element are not constant during the useful life of the mould; in fact, due to the wear of the shearing profile and the consequent increase in shearing clearance, there is a size increase in the shearing profile which leads, as a result, to a greater interference value with the brake element.

The increase in interference between the lamination and the brake element represents a substantial and important drawback by virtue of the fact that such interference is caused, as indicated above, firstly by the formation of pickups on the tracked element and secondly by the breakage of the shearing element.

In fact, taking the example described above and related to laminations obtained with a shearing element having a diameter of 10 mm, it is observed that at the beginning of the useful life of the shearing mould, the portion of the diameter of the lamination obtained is equal to 10 mm (i.e., it is equal to the size of the diameter of the shearing element) and after a number "n" of strokes (typically n-million strokes) of the shearing element (with the value "n", which depends on the wear of the mould) the diameter of the lamination can grow to a value, for example, equal to 10.01 mm and, considering that the brake element has a fixed size equal to 9.99 mm, at the beginning of the useful life of the mould the size difference between the brake element and the shearing mould is equal to 0.01 mm and after a number "n" of work cycles the same interference passes to a value equal to 0.02 mm.

The increase in the aforementioned interference is an inconvenience, given the fact that it causes an increase in the value of the stresses in the brake element with a consequent and undesirable breakage of both the brake and the shearing element.

This problem is particularly felt in the case of laminations with a "T" profile, for which the presence of angles in the profile defines the presence of "problematic" areas since, as is known, the angles define stress intensification zones and, consequently, they represent weakening points of the shearing element and in which the deformations and the stresses which then lead to the formation of cracks can be located.

As a related consequence, the above drawback entails the fact that the useful life of the shearing mould is reduced and this leads, as a further negative consequence, to an increase in the costs related to the shearing moulds.

In order to slow the above drawback, the shearing moulds are periodically subjected to a "sharpening" operation of the moulds, i.e., a maintenance operation which includes "reviving" the shearing profile to restore the aforementioned clearance; this operation requires grinding the shearing elements of the mould which causes a reduction in the height of the same and, consequently, a reduction in the useful life of the mould.

The above drawback causes a further drawback represented by the fact that the sharpening operation requires a machine stop of the shearing apparatus and this entails an increase in production times and therefore an increase in all related costs.

A further drawback related to the increase in the value of the interference is represented by a deterioration in the quality of the individual laminations and, therefore, by a loss in the quality of the laminar package obtained by the overlapping of said laminations, with the related problems in terms of performance, efficiency, occurrence of unwanted vibrations and noise on the electric machines which mount the aforementioned package.

SUMMARY

The object of the present invention is to overcome the drawbacks described above.

More particularly, the object of the present invention is that of providing a brake device for the realization of laminar packages for electrical use adapted to avoid, during the lamination shearing step, that increases in interference can be created between the brake element and the shearing mould.

A further object of the present invention is to provide a brake device adapted to allow an absorption of the deformations of the sheared laminations during the shearing process thereof, avoiding that pickups can be formed on the sheared profile.

A further object of the present invention is to provide a brake device adapted to prevent premature wear and/or breakage of the shearing mould.

Another object of the present invention is to provide a brake device for shearing apparatuses which allows to ensure the quality of the sheared laminations and which, therefore, allows the realization of a laminar package characterized by optimal efficiency, absence of vibrations and/or noise on the electric machines which mount said package.

A further object of the present invention is to provide users with a brake device for the realization of laminar packages for electrical use which is adapted to ensure high resistance and durability over time and such as to be easily and economically made.

These and other objects are achieved by the invention having the features according to claim 1.

According to the invention, a brake device is provided for the realization of laminar packages for electrical use defined by the overlapping of magnetic laminations formed by shearing, coupled to a shearing apparatus below a shearing mould, with said brake device comprising a brake block, provided with an opening with a shape corresponding to that of a lamination and with a smaller size than that of the lamination to define an interference (A) with said lamination functional to the packing of the laminations and comprising mechanical stress compensation means adapted to keep said interference constant (A).

Advantageous embodiments of the invention appear from the dependent claims.

BRIEF DESCRIPTION OF THE DRAWINGS

The constructive and functional features of the brake device for the realization of laminar packages for electrical use of the present invention can be better understood from the following detailed description in which reference is made to the attached drawings which represent a preferred and non-limiting embodiment and in which.

DETAILED DESCRIPTION

Figure 1:
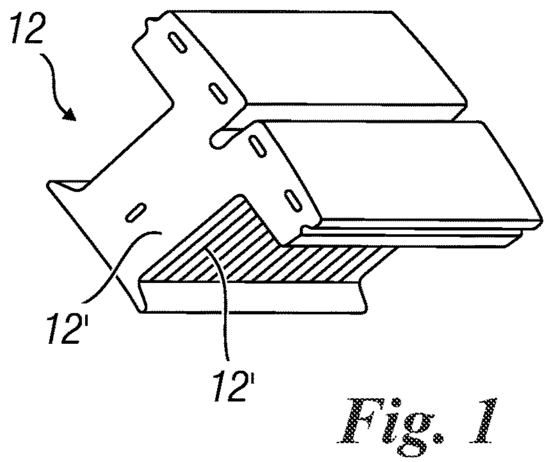
FIG. 1 schematically depicts an axonometric view of a laminar package with a "T" profile.
Figure 2:
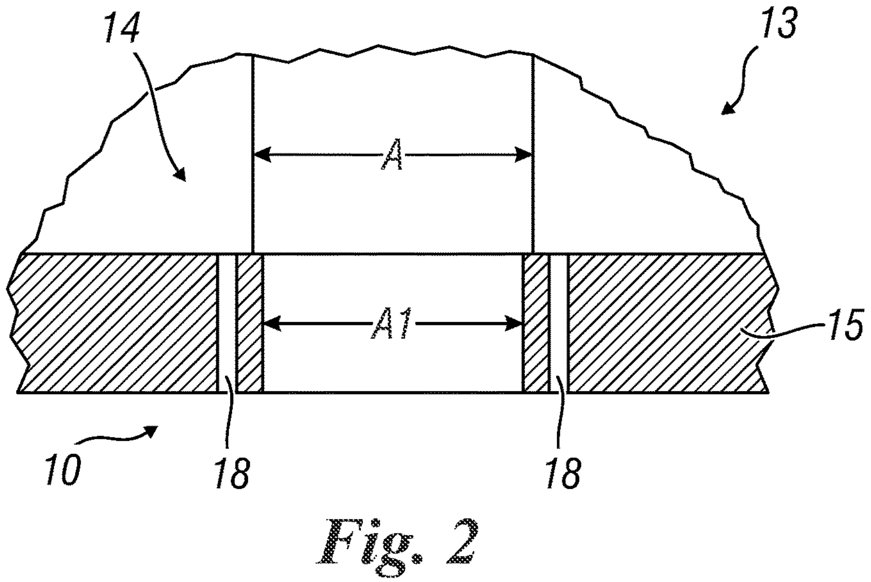
FIG. 2 schematically depicts a sectional view of a lamination shearing and packing apparatus comprising the brake device of the invention.
Figure 3:
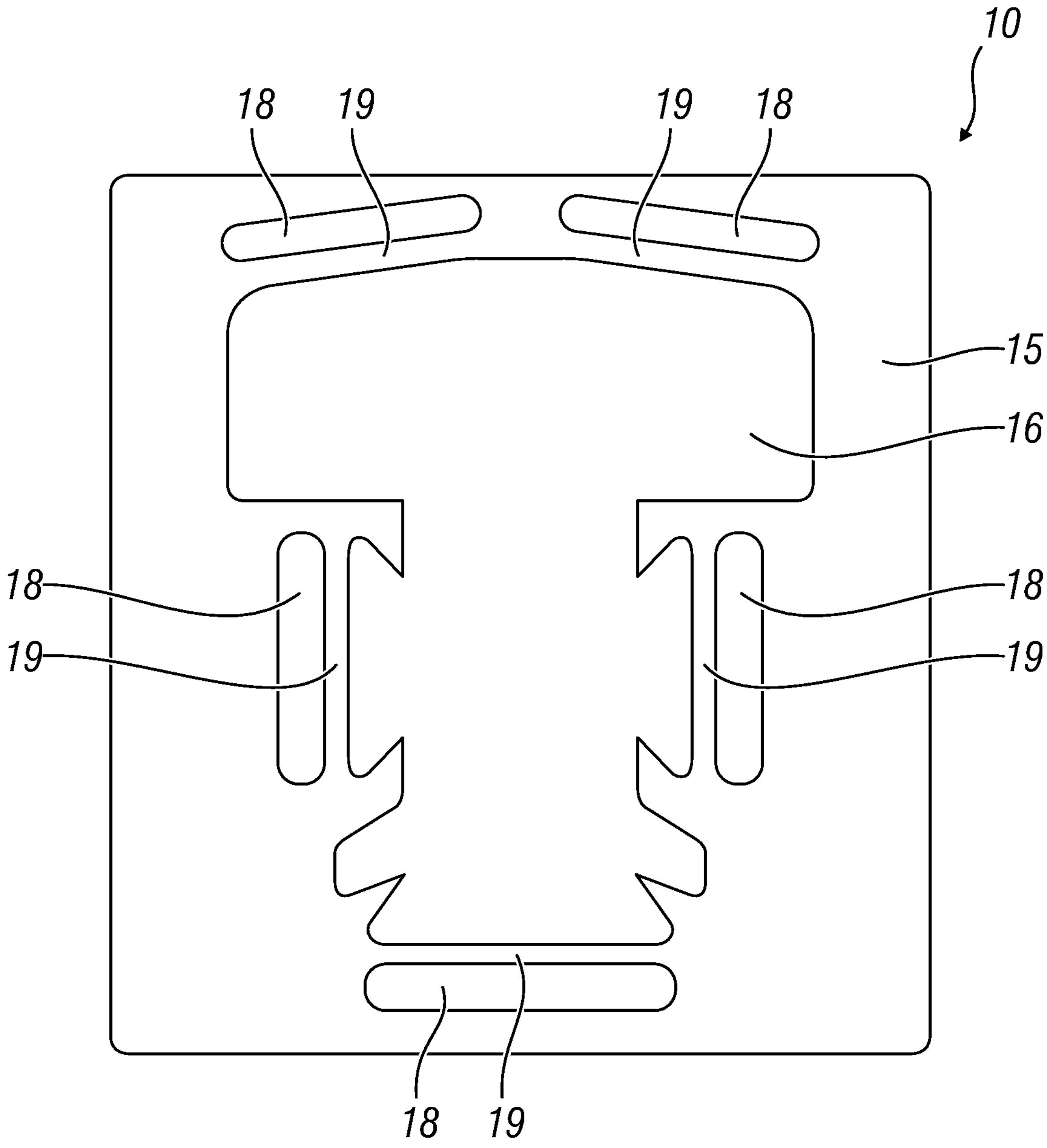
FIG. 3 schematically depicts a plan view of the brake device for the realization of laminar packages of the invention.

The brake device for the realization of laminar packages for electrical use of the invention is described, with reference to FIGS. 1 to 3, referring to the realization of a laminar package with a "T" profile, i.e., a laminar package consisting of a plurality of individual "T"-shaped laminations 12' overlapping one another to form the aforementioned package 12 which forms a portion or module of a laminar package, for example discoidal, of a rotor or stator core (the features of such laminar package are not described in detail herein, as known).

FIG. 2 schematically illustrates a shearing apparatus 13 comprising a shearing mould 14 and the brake device 10 which, as is known, is arranged below the shearing mould 14, with the brake device 10 which, as described above, has a size A1 slightly smaller than the size A of the shearing mould 14 in order to generate an interference "Δ" necessary for packing the laminations 12' (in the case of discoidal-shaped lamination, the sizes A and A1 are indicative of the diameters of the shearing mould and the brake device).

FIG. 3 depicts a sectional plan view of the brake device 10 of FIG. 2 comprising a brake block 15 (made of steel or sintered material, composite material or other material suitable for the purpose) provided with an opening 16 formed according to an axial direction of movement of a shearing element (not depicted) of the shearing apparatus 13; the shape of said opening 16 is realized as a function of the type of profile of the lamination 12' sheared to form the laminar package 12 and in the specific case of FIG. 3, the shape of the opening 16 of the block 15 is of the "T" type, i.e., like the shape of the laminar package 12 of FIG. 1.

Outside the opening 16 and along the peripheral edge of said opening, through or blind-type pockets 18 are formed which extend in the thickness of the block 15 of the brake device 10.

Said pockets 18 preferably have a shape in cross section (according to a plane perpendicular to the extension direction thereof in the thickness of the block 15) of the slotted type; it is to be understood that the shape of said pockets can also be different.

The pockets 18 are realized at the stress intensification zones of the lamination 12', i.e., in the regions thereof where there is a greater concentration of stresses (for example, at the edges or in zones where there are section variations, etc.); said stress intensification zones of the lamination 12' correspond to weakening areas of the shearing element.

A single pocket 18 is arranged at each specific and predefined yielding zone of the brake block 15 corresponding to the yielding zones of the lamination, with an extension in length, according to a plane perpendicular to the extension direction of the same pocket in the thickness of the block 15, which substantially corresponds to the extension of said yielding zones of the lamination 12'; in particular, the size in length and width of the single pocket 18 is a function of the deformation of the single lamination 12' sheared by the shearing element.

At a single yielding zone of the block 15 there is at least one pocket 18, the number of said pockets is a function of the extension of the yielding zone of the block 15 and, therefore, is a function of the magnitude of the predefined stresses (as they are pre-calculated during the design step of the type of laminar package to be made).

Between the single pocket 18 and the opening 16 of the block 15 there is therefore a block portion 15 defining a thin wall or membrane 19 separating said pocket from the opening 16 whose function will appear clearer below.

Said pockets 18, by virtue of the position thereof and the presence of the thin wall or membrane 19, form a "shock absorber" during the shearing and packing process of the laminations; more in particular, said pockets 18 expand during the shearing of the lamination, allowing an absorption of the deformations of the thin wall or membrane 19 caused by the interference between the lamination and the brake device as described above.

The position of the pockets 18 is a function of the deformation of the yielding zones or areas of the block 15 of the brake device 14 and, more specifically, said pockets 18 are positioned and realized so that they can all expand (given the presence of the thin wall or membrane 19 defining an elastic wall or membrane) by the same amount when subjected to the same force; in fact, the size increase of the lamination is assumed to be the same on the entire perimeter of the lamination during the useful life of the shearing mould (considering what has been described above, in fact, the size of the lamination is a function of the shearing clearance of the shearing element which is the same on the entire shearing profile).

Figure 4:
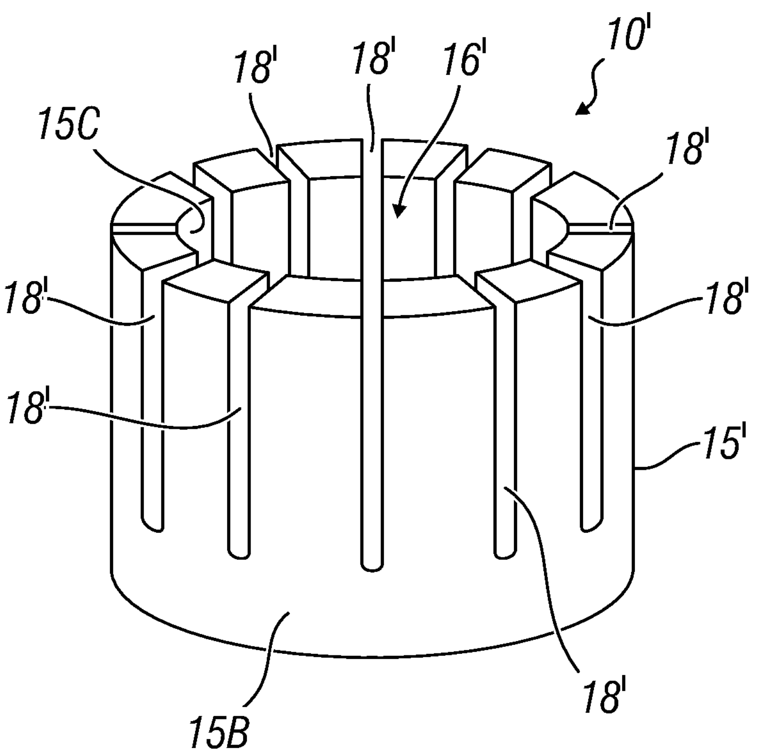
FIG. 4 schematically depicts an axonometric view of the brake device of the invention according to a configuration of an alternative embodiment.

With reference to FIG. 4, an alternative embodiment for the brake device of the invention is illustrated, indicated overall with 10' and comprising a brake block 15' (likewise made of steel or sintered material, composite material or other material suitable for the purpose) provided with an opening 16' formed according to an axial movement direction of a shearing element (not depicted) of the shearing apparatus 13; the shape of said opening 16' is realized as a function of the type of lamination profile (for example, a circular lamination) sheared to form the laminar package. Outside said opening 16' and along the peripheral edge of said opening, pockets 18' are formed which, according to such an embodiment, extend axially in the thickness of the brake body 15' for a finite length to define a blind pocket and are distributed according to a radial direction.

In the embodiment shown in FIG. 4, said pockets 18' are formed transversely to the longitudinal/axial extension direction of the brake body starting from the outer side surface 15B of the brake body in the direction of the inner side surface 15C of the brake body 15 at the opening 16' to define pockets which are laterally open or are through along the aforementioned transverse direction; however, said pockets can also be blind along the aforementioned transverse direction to define a membrane or thin wall as previously described between said single pockets and the opening 16'.

The presence of the pockets 18 (18') allows the brake device 10 (10') to self-adapt to the shape of the lamination during the shearing process of the laminations themselves.

Figure 5:
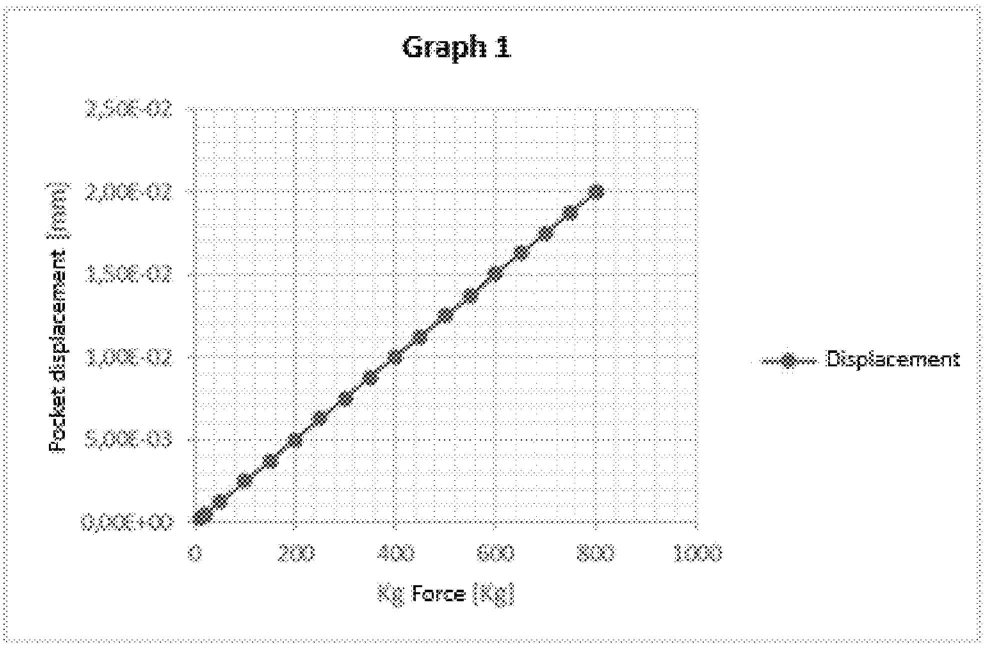
FIGS. 5 and 6 depicts two graphs showing, respectively the displacement trend of the yielding element and the stress trend measured according to the invention.
Figure 6:
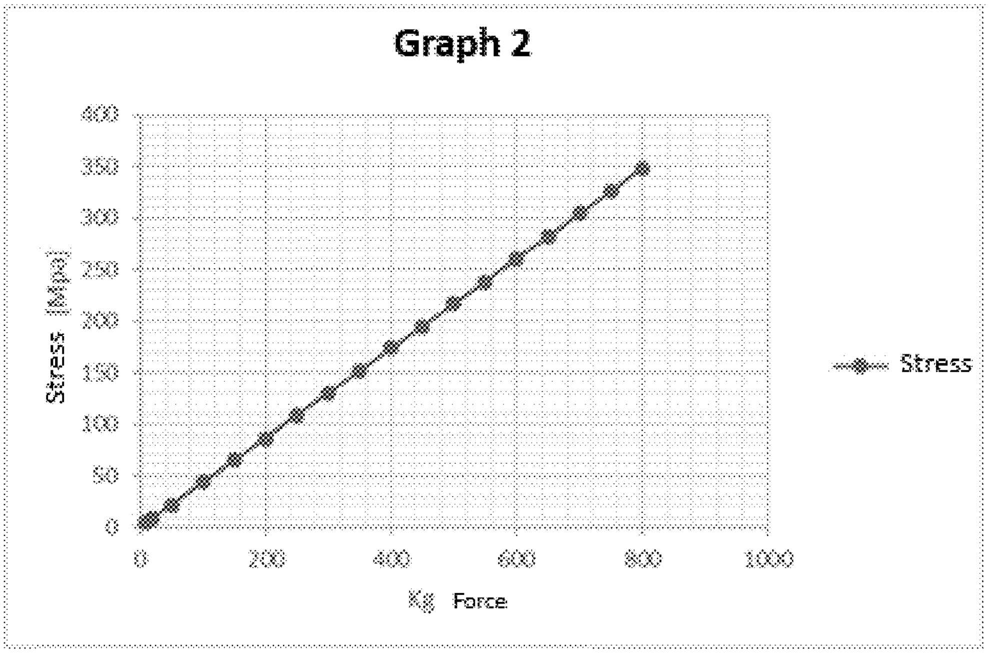

Mechanical tests carried out on the device at different force conditions applied to the opening 16 (16') of the brake block 15 (15') of the brake device 10 (10') have revealed that the displacement trend (measured in millimetres) (FIG. 5) of the yielding element (defined by the pockets 18 (18')) and the stress trend (measured in megapascals [MPa]) (FIG. 6) thereon are linear as a function of the force applied.

FIGS. 1 to 3 illustrate the brake device for the realization of laminar packages with a "T"-type profile; it is to be understood, however, that the stress compensation or "shock absorbing" means described above can also be applied to laminations with different profiles such as, for example, discoidal-profile laminations and the like.

As can be seen from the foregoing, the advantages achieved by the brake device for the realization of laminar packages of the present invention are evident.

The brake device for the realization of laminar packages of the present invention advantageously allows to prevent the breakage of the shearing elements during the lamination shearing processes.

A further advantage of the brake device of the invention is represented by the fact that it allows to eliminate pickups on the sheared profiles.

Further advantageous is the fact that the "shock-absorbing" behaviour of the brake device of the invention allows to keep the "Δ" constant between the brake and the sheared lamination and, consequently, avoids the occurrence of interference forces which tend to cause the shearing element to break.

Additionally, advantageous is the fact that the elastic behaviour of the brake device allows a reduction in the number of sharpenings of the moulds and, consequently, allows a reduction in the machine stops and related costs.

A further advantage is that the pockets of the brake device define a yielding element of the same brake and, in the event of excessive expansion of the sheared lamination, the breakage of such a yielding element will occur and not of the shearing resulting element, in cost savings, considering that the shearing element and the mould have a much higher cost than that of the brake device.

Further advantageous is the fact that the brake device of the invention allows to ensure an optimal quality of the sheared laminations and, therefore, allows the realization of a laminar package characterized by optimal efficiency, absence of vibration and/or noise in the electric machines which mount the aforementioned laminar package.

Although the invention has been described above with particular reference to an embodiment given merely by way of non-limiting example, numerous modifications and variations will be apparent to a person skilled in the art in the light of the above description. Therefore, the present invention intends to embrace all the modifications and variations which fall within the scope of the following claims.

The invention claimed is:

1. An apparatus for a realization of laminar packages for electrical use defined by an overlapping of magnetic laminations formed by shearing, said apparatus comprising:

a brake device;

a shearing mould, wherein the brake device is positioned below the shearing mould;

said brake device comprises a brake block provided with an opening formed according to an axial direction of movement of a shearing element of the apparatus and with a shape corresponding to that of a lamination sheared by said shearing element;

said brake device has a size smaller than a size of the shearing mould that forms the lamination to define an interference functional to a packing of the laminations; and the brake device comprises mechanical stress compensation means adapted to keep said interference constant, wherein said mechanical stress compensation means comprise pockets formed outside the opening of the brake block and extended in a thickness of the axial direction of said brake block and along the peripheral edge of the opening.

2. The apparatus according to claim 1, wherein the pockets are formed in zones of the brake block at stress intensification zones of the lamination corresponding to weakening areas of the shearing element where there is a greater concentration of stresses.

3. The apparatus according to claim 1, wherein the pockets extend throughout an entirety of the thickness of the brake block.

4. The apparatus according to claim 1, wherein the pockets form a cavity extending partially into the brake block.

5. The apparatus according to claim 1, wherein the pockets are axially extended in the thickness of the brake body and are distributed according to a radial direction.

6. The apparatus according to claim 1, wherein the pockets have an extension in length corresponding to the extension of the stress intensification zones of the lamination.

7. The apparatus according to claim 1, wherein the brake device comprises at least one of the pockets at each stress intensification zone of the lamination.

8. The apparatus according to claim 1, wherein the brake block comprises a thin wall or membrane separating the pocket and the opening defining an elastic wall or membrane functional to an expansion of the pockets as a function of deformations of the lamination.

9. The apparatus according to claim 3, wherein the pockets form elongated slotted openings fully traversing an axial height of the brake device.

* * * * *